United States Patent
Yang et al.

(10) Patent No.: US 9,039,265 B2
(45) Date of Patent: May 26, 2015

(54) DISPLAY MODULE

(71) Applicants: Wen-Pin Yang, Hsin-Chu (TW); Chen-Lung Chen, Hsin-Chu (TW)

(72) Inventors: Wen-Pin Yang, Hsin-Chu (TW); Chen-Lung Chen, Hsin-Chu (TW)

(73) Assignee: YOUNG LIGHTING TECHNOLOGY INC., Hsin-Chu (TW)

( * ) Notice: Subject to any disclaimer, the term of this patent is extended or adjusted under 35 U.S.C. 154(b) by 204 days.

(21) Appl. No.: 13/780,940

(22) Filed: Feb. 28, 2013

(65) Prior Publication Data

US 2013/0223094 A1    Aug. 29, 2013

(30) Foreign Application Priority Data

Feb. 29, 2012  (TW) .............................. 101106463 A

(51) Int. Cl.
*F21V 8/00*    (2006.01)

(52) U.S. Cl.
CPC ............ *G02B 6/0031* (2013.01); *G02B 6/0085* (2013.01)

(58) Field of Classification Search
None
See application file for complete search history.

(56) References Cited

U.S. PATENT DOCUMENTS

| | | | |
|---|---|---|---|
| 2010/0066937 A1* | 3/2010 | Yamashita et al. | 349/58 |
| 2010/0073582 A1* | 3/2010 | Konno et al. | 348/794 |
| 2012/0002441 A1* | 1/2012 | Yabe et al. | 362/607 |
| 2012/0275182 A1* | 11/2012 | Chen | 362/602 |

FOREIGN PATENT DOCUMENTS

| | | |
|---|---|---|
| JP | 2006-154320 A | 6/2006 |
| JP | 2006-338019 A | 12/2006 |
| JP | 2010-40434 A | 2/2010 |
| JP | 2010-73506 A | 4/2010 |
| TW | 200821680 A | 5/2008 |
| TW | 200846776 A | 12/2008 |
| TW | 201011403 A | 3/2010 |
| TW | M413881 U1 | 10/2011 |
| TW | M415319 U1 | 11/2011 |

OTHER PUBLICATIONS

TW Office Action dated Jun. 11, 2014.

* cited by examiner

*Primary Examiner* — Britt D Hanley
(74) *Attorney, Agent, or Firm* — Muncy, Geissler, Olds & Lowe, P.C.

(57) ABSTRACT

A display module has a display panel and a backlight module disposed on one side of the display panel. The backlight module includes a heat sink, a light bar, a light guide plate, a first reflective sheet, and a second reflective sheet. The light bar abuts against one side of the heat sink. The first reflective sheet is disposed adjacent to a bottom surface of the light guide plate, and the second reflective sheet is disposed adjacent to an edge of a light-emitting surface of the light guide plate. The second reflective sheet has a first part and a second part forming an included angle with the first part, the first part is attached to the heat sink or the light bar, and the second part overlaps a part of the light-emitting surface of the light guide plate.

11 Claims, 6 Drawing Sheets

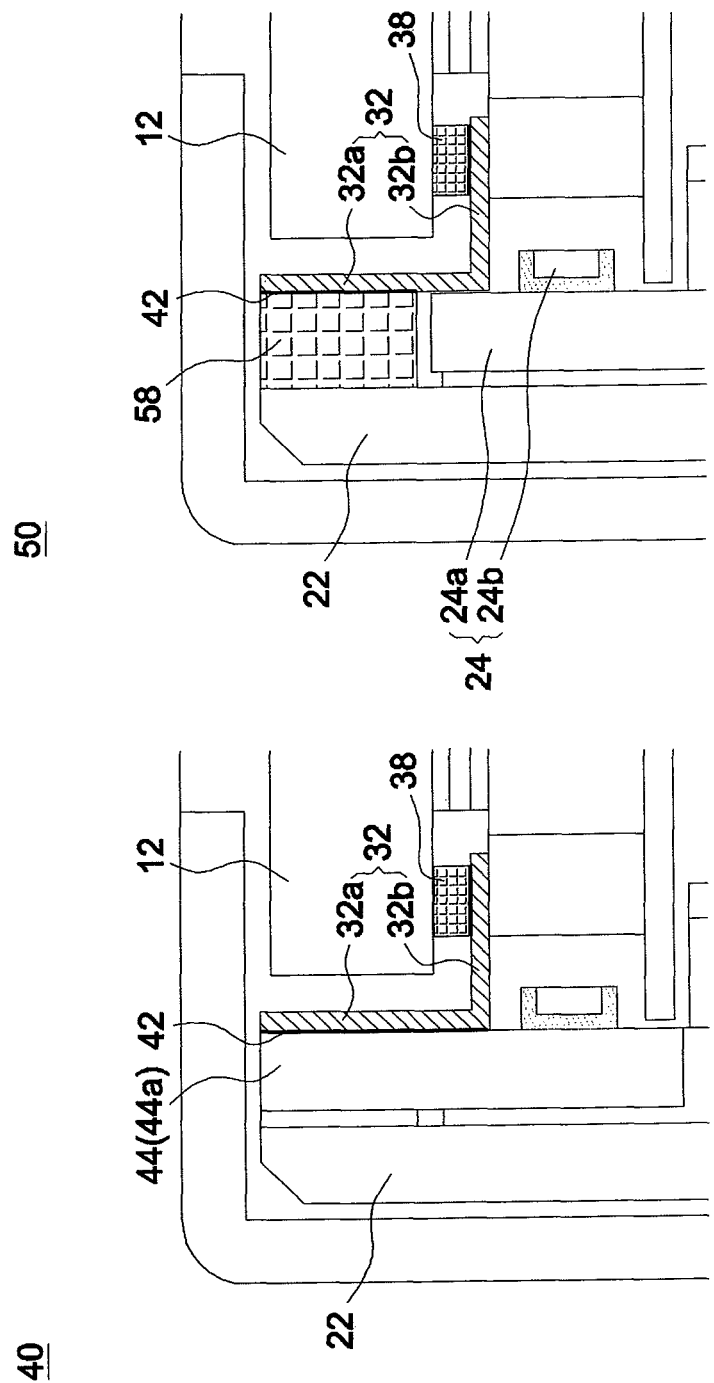

DISPLAY MODULE

BACKGROUND OF THE INVENTION a. Field of the Invention

The invention relates to a display module.

b. Description of the Related Art

FIG. 1 shows a schematic diagram of a conventional display module. Referring to FIG. 1, in a display module 1, a plastic frame 3 engaging with a back plate 2 may support and fix a display panel 4 in place. In order to eliminate light leakage, silica gel 6 is attached to a bottom side of the plastic frame 3 near a light bar 5 to seal a gap between a light guide plate 7 and the plastic frame 3 to therefore avoid light leakage and ensure competent image quality. Besides, a side reflective sheet 8 is attached to the bottom side of the plastic frame 3 near the light bar 5 to improve optical coupling efficiency between the light bar 5 and the light guide plate 7, where a part of a light beam emitted from the light bar 5 is reflected back to the light guide plate 7 by the side reflective sheet 8 on the light bar 5 to improve optical coupling efficiency.

Taiwan patent application publication No. 200821680 discloses a liquid crystal display module, where a liquid crystal display panel is disposed on a backlight module, a buffer strip is disposed between the liquid crystal display panel and a light guide plate, and a reflective sheet is disposed between the buffer strip and the light guide plate. Taiwan patent application publication No. 200846776 discloses a side-emitting type lighting module, where a reflective cover is connected with a heat-conductive frame to guide light beams emitted by light-emitting diodes towards a light guide plate to hence improve light-utilization efficiency.

BRIEF SUMMARY OF THE INVENTION

The invention provides a display module having high optical coupling efficiency, alignment accuracy, and image quality.

Other objects and advantages of the invention may be further illustrated by the technical features broadly embodied and described as follows. In order to achieve one of the above purposes or other purposes, one embodiment of the invention provides a display module having a display panel and a backlight module disposed on one side of the display panel. The backlight module includes a heat sink, a light bar, a light guide plate, a first reflective sheet, and a second reflective sheet. The light bar abuts against one side of the heat sink, and the light guide plate is capable of guiding a light beam emitted from the light bar. The light guide plate has a light incident surface adjacent to the light bar, a light-emitting surface forming an included angle with the light incident surface, and a bottom surface opposite to the light-emitting surface. The first reflective sheet is disposed adjacent to the bottom surface of the light guide plate, and the second reflective sheet is disposed adjacent to an edge of the light-emitting surface of the light guide plate. The second reflective sheet has a first part and a second part forming an included angle with the first part, the first part is attached to the heat sink or the light bar, and the second part overlaps a part of the light-emitting surface.

In one embodiment, a spacer is disposed between and abuts against the second part of the second reflective sheet and the display panel. The spacer may include at least one of silica gel and foam.

In one embodiment, an optical film set is disposed between the light guide plate and the display panel and includes at least a diffuser film and a brightness enhancement film stacked with each other. The sum of a thickness of the spacer and a thickness of the second part of the second reflective sheet may be substantially equal to a thickness of the optical film set.

In one embodiment, the light bar includes a substrate and at least one light-emitting diode disposed on the substrate, and the second part of the second reflective sheet is positioned between the substrate and the optical film set.

In one embodiment, a front bezel is used to confine the display panel and the backlight module on a back plate.

In one embodiment, the first part of the second reflective sheet is fixed on the heat sink or the light bar by an adhesive tape.

In one embodiment, the display panel is a liquid crystal display panel.

According to another embodiment of the invention, a display module includes a display panel and a backlight module disposed on one side of the display panel. The backlight module includes a heat sink, a light bar, a light guide plate, a first reflective sheet, a second reflective sheet, a first spacer, and a second spacer. The light bar abuts against one side of the heat sink, and the light guide plate is capable of guiding a light beam emitted from the light bar. The light guide plate has a light incident surface adjacent to the light bar, a light-emitting surface forming an included angle with the light incident surface, and a bottom surface opposite to the light-emitting surface. The first reflective sheet is disposed adjacent to the bottom surface of the light guide plate, and the second reflective sheet is disposed adjacent to an edge of the light-emitting surface of the light guide plate and has a first part and a second part forming an included angle with the first part. The first spacer is disposed between and abuts against the second part of the second reflective sheet and the display panel. The second spacer is disposed on the light bar, and two ends of the second spacer respectively abut against the heat sink and the first part of the second reflective sheet. The first part of the second reflective sheet is attached to the second spacer, and the second part of the second reflective sheet overlaps a part of the light-emitting surface.

In one embodiment, the first spacer includes at least one of silica gel and foam, and the second spacer includes silica gel, a metal strip or a plastic strip.

In one embodiment, an optical film set is disposed between the light guide plate and the display panel and includes at least a diffuser film and a brightness enhancement film stacked with each other. The sum of a thickness of the first spacer and a thickness of the second part of the second reflective sheet may be substantially equal to a thickness of the optical film set.

In one embodiment, the light bar includes a substrate and at least one light-emitting diode disposed on the substrate, and the second part of the second reflective sheet is positioned between the substrate and the optical film set.

In one embodiment, a front bezel is used to confine the display panel and the backlight module on a back plate.

In one embodiment, the first part of the second reflective sheet is fixed on the second spacer by an adhesive tape.

According to another embodiment of the invention, a display module includes a back plate, a display panel disposed on the back plate, and a backlight module disposed on one side of the display panel and confined on the back plate. The backlight module includes a light bar, a light guide plate, a first reflective sheet, and a second reflective sheet. The light bar abuts against one side of the back plate, and the light guide plate is capable of guiding a light beam emitted from the light bar. The light guide plate has a light incident surface adjacent to the light bar, a light-emitting surface forming an included angle with the light incident surface, and a bottom surface opposite to the light-emitting surface. The first reflective sheet is disposed adjacent to the bottom surface of the light guide plate, and the second reflective sheet is disposed adjacent to an edge of the light-emitting surface of the light guide plate. The second reflective sheet has a first part and a second part forming an included angle with the first part, the first part is attached to the back plate, and the second part overlaps a part of the light-emitting surface.

According to another embodiment of the invention, a display module includes a back plate, a display panel disposed on the back plate, and a backlight module disposed on one side of the display panel and confined on the back plate. The backlight module includes a light bar, a light guide plate, a first reflective sheet, a second reflective sheet, a first spacer, and a second spacer. The light bar abuts against one side of the back plate, and the light guide plate is capable of guiding a light beam emitted from the light bar. The light guide plate has a light incident surface adjacent to the light bar, a light-emitting surface forming an included angle with the light incident surface, and a bottom surface opposite to the light-emitting surface. The first reflective sheet is disposed adjacent to the bottom surface of the light guide plate, and the second reflective sheet is disposed adjacent to an edge of the light-emitting surface of the light guide plate. The second reflective sheet has a first part and a second part forming an included angle with the first part. The first spacer is disposed between and abuts against the second part of the second reflective sheet and the display panel. The second spacer is disposed on the light bar, and two ends of the second spacer respectively abut against the back plate and the first part of the second reflective sheet. The first part of the second reflective sheet is attached to the second spacer, and the second part of the second reflective sheet overlaps a part of the light-emitting surface.

In conclusion, the embodiment or the embodiments of the invention may have at least one of the following advantages.

According to the above embodiment, a part of the second reflective sheet near an edge of a light-emitting surface of a light guide plate is attached to a heat sink, a light bar, a back plate or a spacer to be held in place, and other part of the second reflective sheet extends over the light-emitting surface and is not fixed on the light-emitting surface. Therefore, during an attachment process, components of a display module are allowed to be precisely and easily aligned and fixed in selected positions, without damaging optical films or forming bright spots, to enhance image quality and realize a narrow bezel display module. Besides, the second reflective sheet may be connected with and disposed on the light bar and a part of light-emitting surface to reduce light leakage and improve optical coupling efficiency between a light source and the light guide plate.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 4 shows a schematic diagram of a display module according to another embodiment of the invention.

FIG. 5 shows a schematic diagram of a display module according to another embodiment of the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
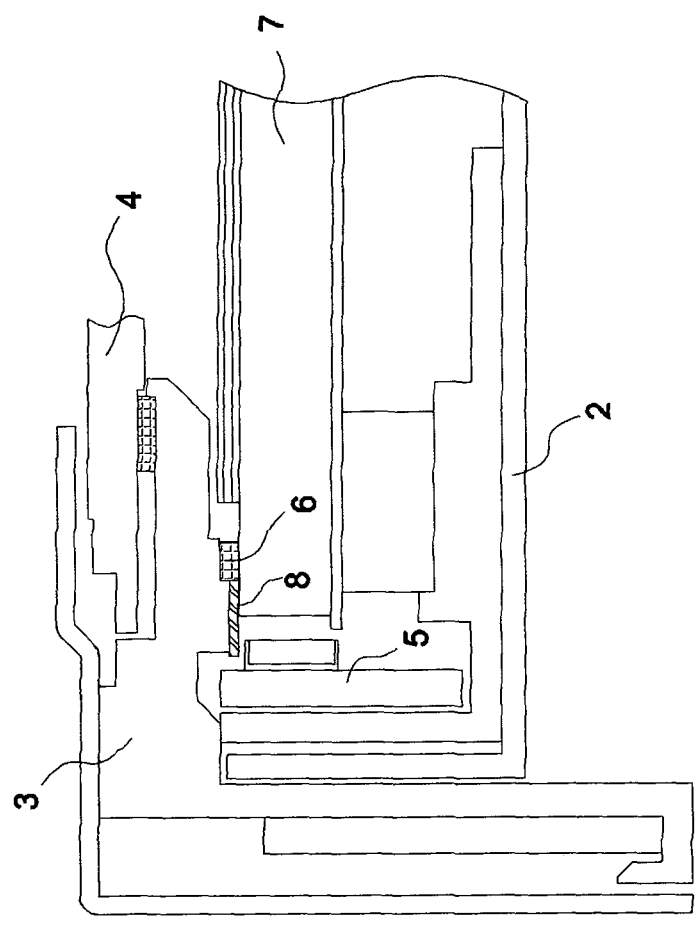
FIG. 1 shows a schematic diagram of a conventional display module.
Figure 2:
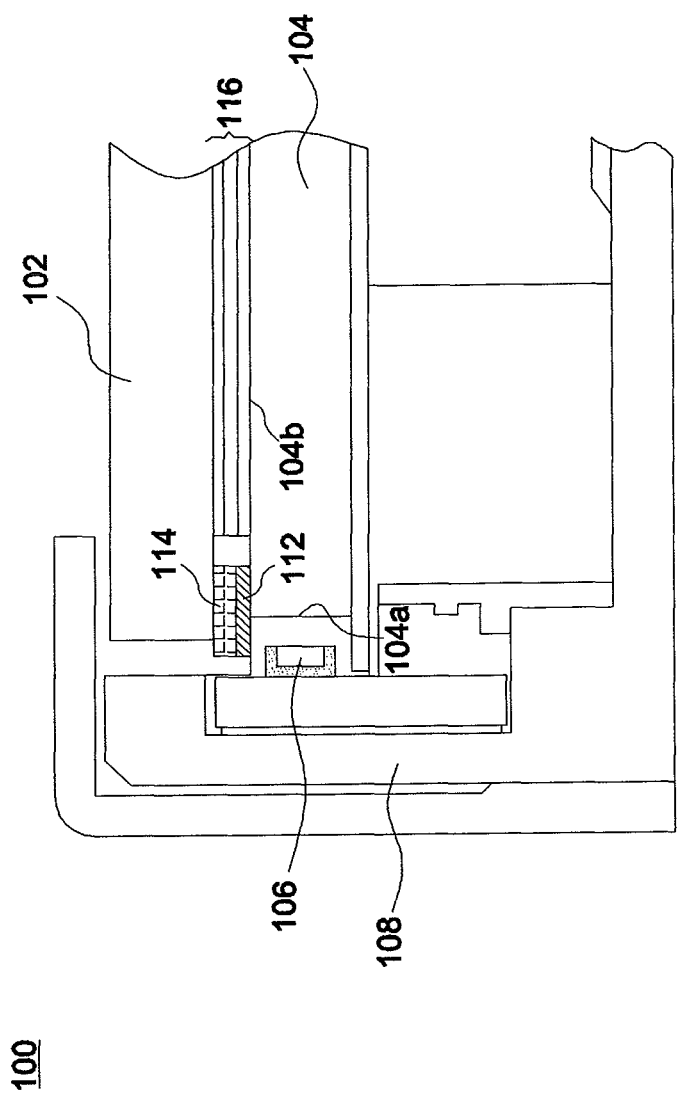
FIG. 2 shows a schematic diagram of a liquid crystal display module for illustrating possible problems as a result of omission of a conventional plastic frame.

FIG. 2 shows a schematic diagram of a liquid crystal display module (LCM) for illustrating possible problems as a result of omission of a conventional plastic frame. Referring to FIG. 2, a liquid crystal display module 100 may realize a narrow bezel display without a plastic frame, where a liquid crystal display panel 102 is disposed on a light guide plate 104, a light source 106 abuts against one side of a heat sink 108, and the light source 106 is disposed adjacent to a light incident surface 104a of the light guide plate 104. In order to eliminate peripheral light leakage, a side reflective sheet 112 and silica gel 114 are disposed near an edge of a light-emitting surface 104b of the light guide plate 104 to prevent light beams from leaving via gaps in an assembled liquid crystal display module. However, in a typical assembly process, the liquid crystal display panel 102 is installed after an optical film set 116 is positioned, and the number of alignment lines for the liquid crystal display panel 102 fails to be increased. Therefore, in case the side reflective sheet 112 and the silica gel 114 are attached to a bottom side of the liquid crystal display panel 102, the side reflective sheet 112 and the silica gel 114 are difficult to be fixed in predetermined positions and thus liable to damage the optical film set 116. Besides, the optical film set 116 may interfere with the side reflective sheet 112 and the silica gel 114 as a result of thermal expansion, in case a gap between the optical film set 116 and the side reflective sheet 112 and the silica gel 114 is not sufficient. Further, in case the side reflective sheet 112 and the silica gel 114 are attached to a top side of the light guide plate 104, the side reflective sheet 112 and the silica gel 114 are difficult to be precisely aligned because the number of alignment lines for the light guide plate 104 similarly fails to be increased. Besides, a double-sided tape (not shown) used for the attachment of the side reflective sheet 112 and light guide plate 104 is liable to cause bright spots and hence result in poor image quality.

Figure 3:
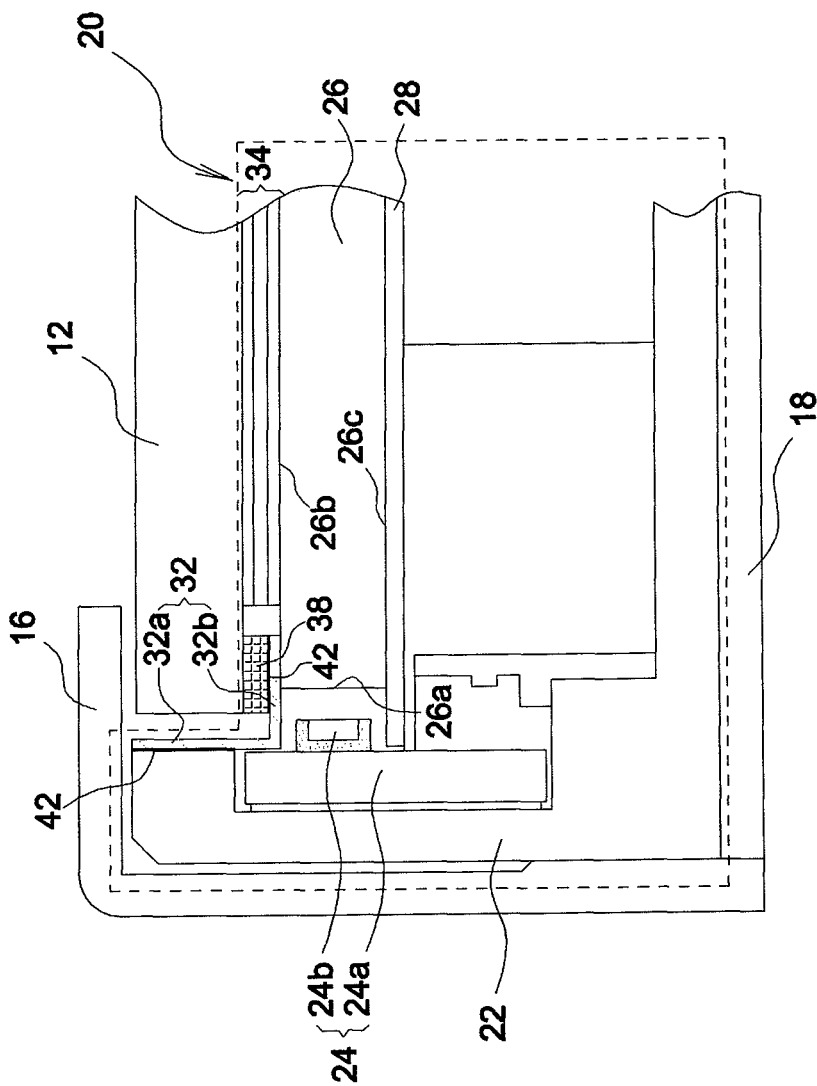
FIG. 3 shows a schematic diagram of a display module according to an embodiment of the invention.

FIG. 3 shows a schematic diagram of a display module according to an embodiment of the invention. Referring to FIG. 3, a display module 10 includes a display panel 12 and a backlight module 20 disposed on one side of the display panel 12. The backlight module 20 includes a heat sink 22, a light bar 24, a light guide plate 26, a first reflective sheet 28, and a second reflective sheet 32. The light bar 24 abuts against one side of the heat sink 22, and the light guide plate 26 is capable of guiding a light beam emitted from the light bar 24. The light guide plate 26 has a light incident surface 26a adjacent to the light bar 24, a light-emitting surface 26b forming an included angle with the light incident surface 26a, and a bottom surface 26c opposite to the light-emitting surface 26b. The first reflective sheet 28 is disposed adjacent to the bottom surface 26c of the light guide plate 26 to reflect light beams leaving from the bottom surface 26c back to the light guide plate 26. The second reflective sheet 32 is disposed adjacent to an edge of the light-emitting surface 26b of the light guide plate 26 to improve optical coupling efficiency between the light bar 24 and the light guide plate 26. In this embodiment, the second reflective sheet 32 may be bent to form a first part 32a and a second part 32b forming an included angle with the first part 32a. The first part 32a is attached to the heat sink 22, and the second part 32b may horizontally extend to a position over a part of the light-emitting surface 26b. In other words, the second part 32b of the second reflective sheet 32 may overlap a part of the light-emitting surface 26b but is not fixed on the light-emitting surface 26b. Further, the display panel 12 and the backlight module 20 may be disposed on a back plate 18, and a front bezel 16 may be used to confine the display panel 12 and the backlight module 20 on the back plate 18. In this embodiment, the display panel 12 is not limited to a specific type. For example, the display panel 12 may be a liquid crystal display panel that forms a part of a liquid crystal display module (LCM). Besides, an optical film set 34 is disposed between the light guide plate 26 and the display panel 12, and the optical film set 34 may include at least a diffuser film and a brightness enhancement film stacked with each other. The light bar 24 may include a substrate 24a and at least one light-emitting diode 24b disposed on the substrate 24a. In this embodiment, the second part 32b of the second reflective sheet 32 may be positioned between the substrate 24a of the light bar 24 and the optical film set 34, and a spacer 38 is disposed between and abuts against the second part 32b of the second reflective sheet 32 and the display panel 12 to prevent the second part 32b of the second reflective sheet 32 from lifting and thus avoid light leakage to provide high image quality. In one embodiment, the sum of a thickness of the spacer 38 and a thickness of the second part 32b of the second reflective sheet 32 is substantially equal to a thickness of the optical film set 34. Further, in case the second part 32b of the second reflective sheet 32 is connected to a bottom side of a spacer 38 by an adhesive tape 42, an entire thickness of the spacer 38, the second part 32b of the second reflective sheet 32, and the adhesive tape 42 is substantially equal to a thickness of the optical film set 34. The material of the spacer 38 includes, but is not limited to, silica gel or foam.

Referring to FIG. 4, in another embodiment, a light bar 44 of a display module 40 extends upwardly to a height substantially identical to a height of a top end of the heat sink 22, and the first part 32a of the second reflective sheet 32 may be attached to a substrate 44a of the light bar 44. Accordingly, since the light bar 44 extends upwardly to a height substantially identical to a height of the top end of the heat sink 22, the substrate 44a of the light bar 44 is covered with the first part 32a of the second reflective sheet 32 more evenly to provide more practical utilities. Further, as shown in FIG. 5, in another embodiment, the spacer 38 may be disposed between the second part 32b of the second reflective sheet 32 and the display panel 12, and a display module 50 may further include another spacer 58 disposed on the substrate 24a of the light bar 24. Two ends of the spacer 58 respectively abut against the heat sink 22 and the first part 32a of the second reflective sheet 32, and the first part 32a of the second reflective sheet 32 may be attached to the spacer 58. The spacer 58 may be made of, for example, silica gel, a metal strip or a plastic strip, and the spacer 58 allow that the light bar 24 ease to detach in a rework process. In the above embodiments, the first part 32a of the second reflective sheet 32 may be, for example, fixed on the heat sink 22, the light bar 44 or the spacer 58 by the adhesive tape 42, and the second part 32b of the second reflective sheet 32 may be connected to a bottom side of the spacer 38 by the adhesive tape 42. Further, the second reflective sheet 32 may be bent to form an L-shaped cross-section having an included angle of 90 degrees.

Figure 6:
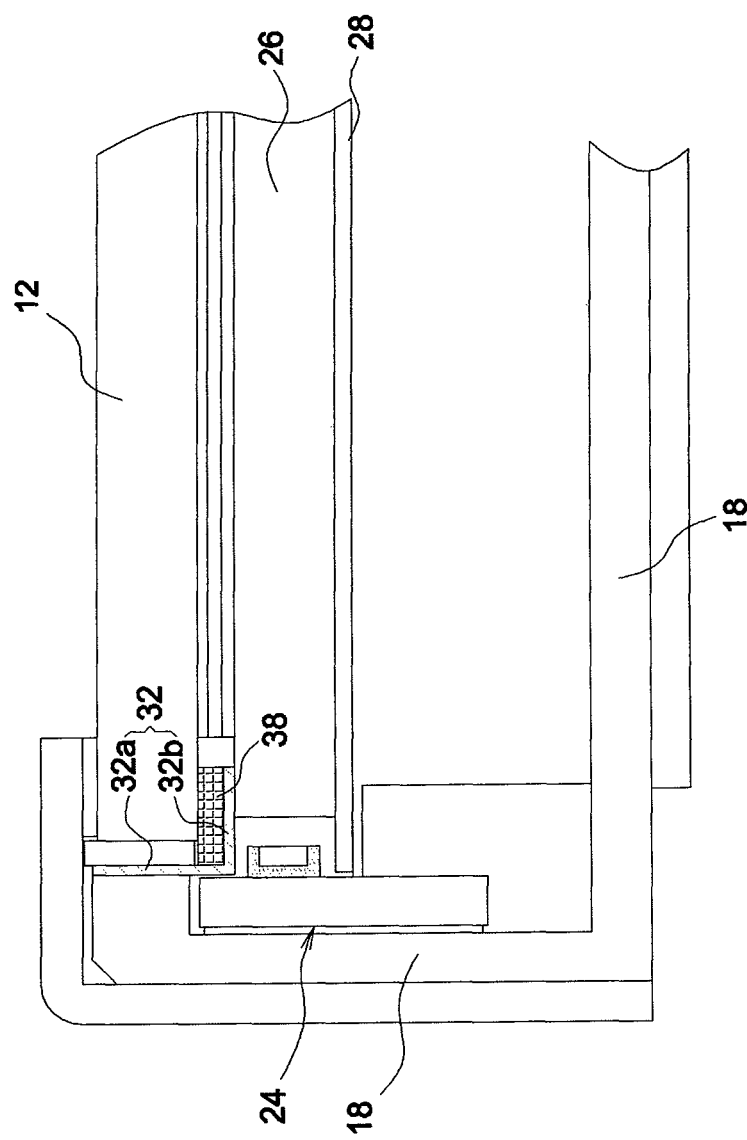
FIG. 6 shows a schematic diagram of a display module according to another embodiment of the invention.
Figure 7:
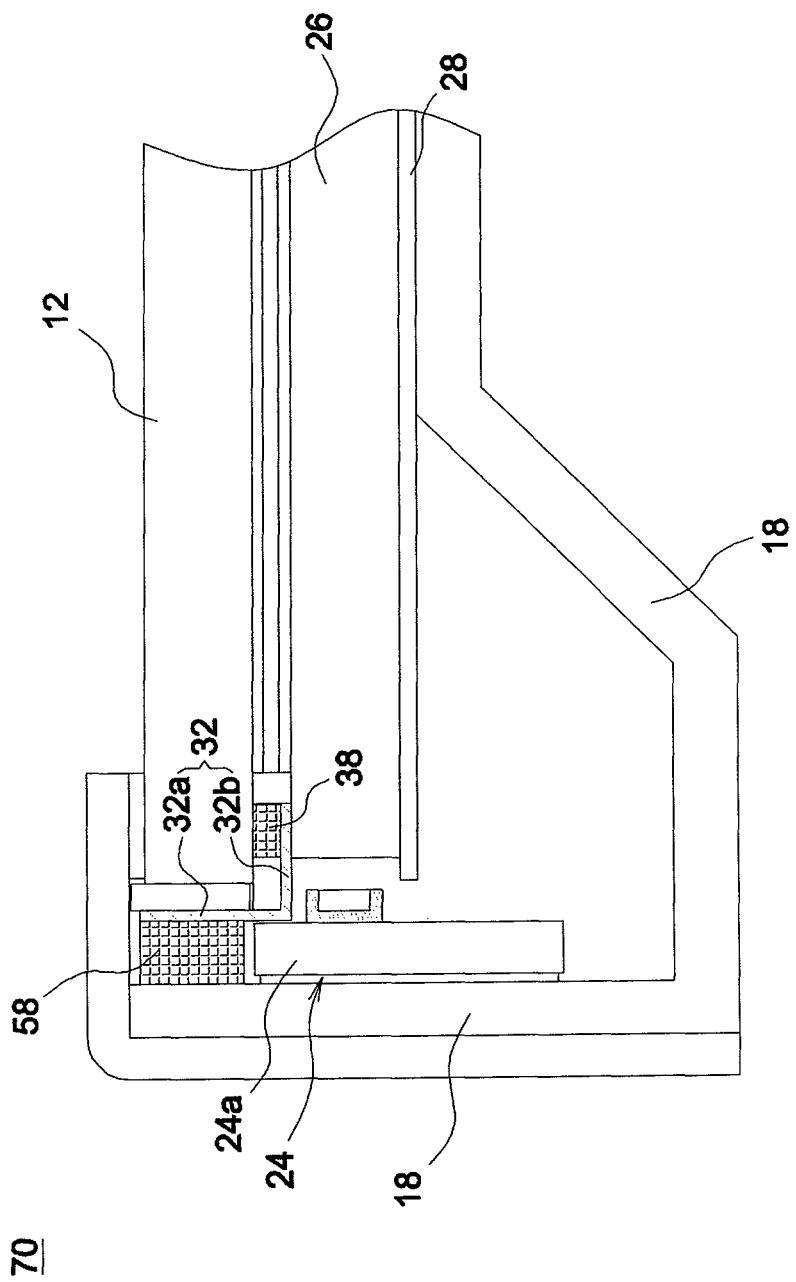
FIG. 7 shows a schematic diagram of a display module according to another embodiment of the invention.

As shown in FIG. 6, in another embodiment, the heat sink 22 described in afore-mentioned embodiments is omitted from a display module 60. In the display module 60, the light bar 24 abuts against one side of the back plate 18, and the first part 32a of second reflective sheet 32 is directly attached to the back plate 18. Further, in another embodiment shown in FIG. 7, the light bar 24 of a display module 70 abuts against one side of the back plate 18, and the spacer 38 is disposed between the second part 32b of the second reflective sheet 32 and the display panel 12. Another spacer 58 is disposed on the substrate 24a of the light bar 24, and two ends of the spacer 58 respectively abut against the back plate 18 and the first part 32a of the second reflective sheet 32. The spacer 58 is made of, for example, silica gel, a metal strip or a plastic strip. In another embodiment not depicted in the drawings, a light bar may extend upwardly to a height substantially identical to a height of a top end of a back plate, and a first part of a second reflective sheet may be attached to a substrate of the light bar to achieve similar effects of the embodiment shown in FIG. 4.

In conclusion, the embodiment or the embodiments of the invention may have at least one of the following advantages.

According to the above embodiment, a part of the second reflective sheet near an edge of a light-emitting surface of a light guide plate is attached to a heat sink, a light bar, a back plate or a spacer to be held in place, and other part of the second reflective sheet extends over the light-emitting surface and is not fixed on the light-emitting surface. Therefore, during an attachment process, components of a display module are allowed to be precisely and easily aligned and fixed in selected positions, without damaging optical films or forming bright spots, to enhance image quality and realize a narrow bezel display module. Besides, the second reflective sheet may be connected with and disposed on the light bar and part light-emitting surface to reduce light leakage and improve optical coupling efficiency between a light source and the light guide plate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A display module, comprising:
    a display panel; and
    a backlight module disposed on one side of the display panel and comprising:
    a heat sink;
    a light bar abutting against one side of the heat sink;
    a light guide plate capable of guiding a light beam emitted from the light bar, the light guide plate having a light incident surface adjacent to the light bar, a light-emitting surface forming an included angle with the light incident surface, and a bottom surface opposite to the light-emitting surface;
    a first reflective sheet disposed adjacent to the bottom surface of the light guide plate;
    a second reflective sheet disposed adjacent to an edge of the light-emitting surface of the light guide plate, wherein the second reflective sheet has a first part and a second part forming an included angle with the first part;
    a first spacer disposed between and abutting against the second part of the second reflective sheet and the display panel; and
    a second spacer disposed on the light bar, wherein two ends of the second spacer respectively abut against the heat sink and the first part of the second reflective sheet, the first part of the second reflective sheet is attached to the second spacer, and the second part of the second reflective sheet overlaps a part of the light-emitting surface.

2. The display module as claimed in claim 1, wherein the first spacer comprises at least one of silica gel and foam.

3. The display module as claimed in claim 1, wherein the second spacer comprises silica gel, a metal strip or a plastic strip.

4. The display module as claimed in claim 1, further comprising:
    an optical film set disposed between the light guide plate and the display panel and comprising at least a diffuser film and a brightness enhancement film stacked with each other.

5. The display module as claimed in claim 4, wherein the light bar comprises a substrate and at least one light-emitting diode disposed on the substrate, and the second part of the second reflective sheet is positioned between the substrate and the optical film set.

6. The display module as claimed in claim 4, wherein the sum of a thickness of the first spacer and a thickness of the second part of the second reflective sheet is substantially equal to a thickness of the optical film set.

7. The display module as claimed in claim 1, further comprising:
    a front bezel used to confine the display panel and the backlight module on a back plate.

8. The display module as claimed in claim 1, wherein the first part of the second reflective sheet is fixed on the second spacer by an adhesive tape.

9. A display module, comprising:
    a back plate;
    a display panel disposed on the back plate; and
    a backlight module disposed on one side of the display panel and confined on the back plate, the backlight module comprising:
    a light bar abutting against one side of the back plate;
    a light guide plate capable of guiding a light beam emitted from the light bar, the light guide plate having a light incident surface adjacent to the light bar, a light-emitting surface forming an included angle with the light incident surface, and a bottom surface opposite to the light-emitting surface;
    a first reflective sheet disposed adjacent to the bottom surface of the light guide plate;
    a second reflective sheet disposed adjacent to an edge of the light-emitting surface of the light guide plate, wherein the second reflective sheet has a first part and a second part forming an included angle with the first part;
    a first spacer disposed between and abutting against the second part of the second reflective sheet and the display panel; and
    a second spacer disposed on the light bar, wherein two ends of the second spacer respectively abut against the back plate and the first part of the second reflective sheet, the first part of the second reflective sheet is attached to the second spacer, and the second part of the second reflective sheet overlaps a part of the light-emitting surface.

10. The display module as claimed in claim 1, wherein the first part of the second reflective sheet is fixed on the heat sink or the light bar by an adhesive tape.

11. The display module as claimed in claim 1, wherein the display panel is a liquid crystal display panel.

\* \* \* \* \*